S. Hagaman.
Slate Polishing Mach.

Nº 94,310. Patented Aug. 31, 1869.

Witnesses
Theo Tusche
G. A. Service

Inventor
S. Hagaman
Per Mmm
Attorneys

United States Patent Office.

STINSON HAGAMAN, OF WEISSPORT, PENNSYLVANIA.

*Letters Patent No. 94,310, dated August 31, 1869.*

IMPROVED SLATE-POLISHING MACHINE.

The Schedule referred to in these Letters Patent and making part of the same.

*To all whom it may concern:*

Be it known that I, STINSON HAGAMAN, of Weissport, Carbon county, Pennsylvania, have invented a new and improved Slate-Polishing Machine; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

This invention relates to a machine for grinding and polishing marble, slate, and other suitable material.

It consists in the use of a large grinding-wheel, which is mounted on a vertical shaft, and below the face of which a number of small disks are arranged, which are mounted on the top ends of vertical shafts, which can be raised and lowered at will, and upon which the material to be ground or polished is placed.

By raising the said disks, the material to be ground is brought in contact with the face of the grinding-wheel, and may then be ground off or polished as desired.

A represents an upright frame, made of wood or other suitable material, in the horizontal bars of which suitable bearings for a vertical shaft, B, are arranged.

On the shaft B is mounted a wheel, C, of suitable dimensions, and made of pumice-stone or other suitable grinding-material, or coated with the same, as may be desired.

A pulley, D, is mounted on the shaft B, and a belt passing over the same imparts motion to the shaft.

On the frame A are also arranged bearings for any desirable number of small vertical shafts E E, which are arranged at equal distances from the shaft B.

Figure 1:
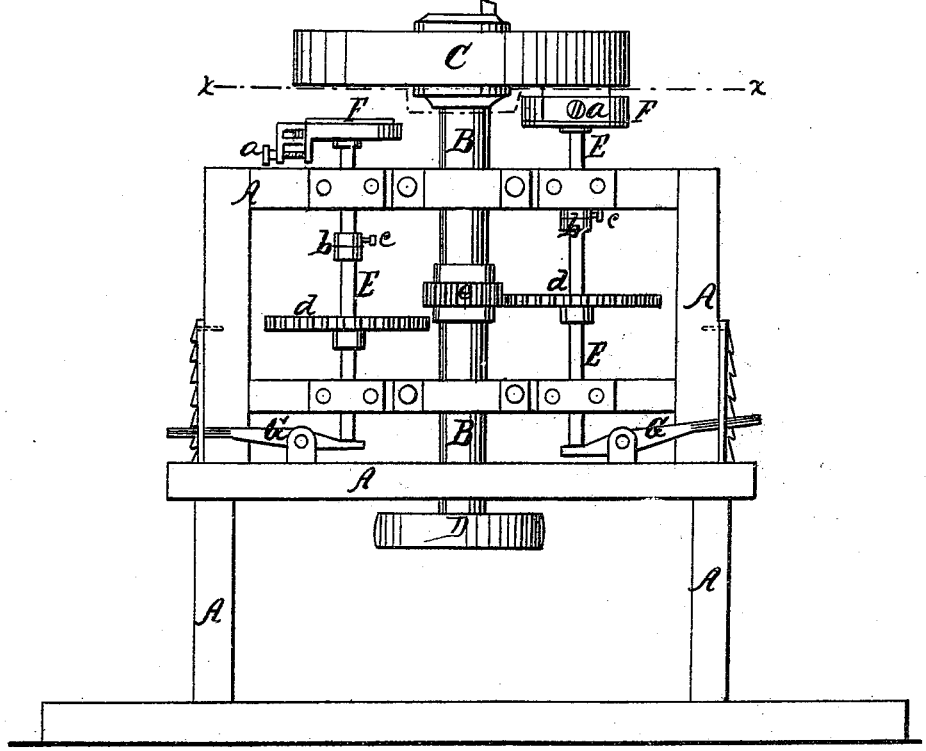
Figure 1 is a side elevation of my improved machine.
Figure 2:
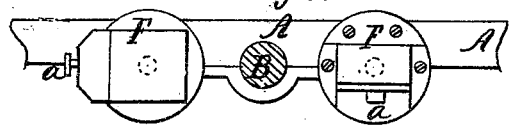
Figure 2 is a detail horizontal sectional view of the same, taken on the line $x\,x$, fig. 1.

The shafts E can slide up and down in their bearings, and on top of each of them is mounted a disk, E, within the surface of which a rectangular or other mortise is arranged, in which the slate or article to be ground is placed, and held by a set-screw, $a$, as is more clearly shown in fig. 2.

The lower end of each shaft E rests upon the inner arm of a lever, or treadle, G, whereby it can be raised or lowered at will.

By placing a slate upon one of the disks, F, and raising the shaft E, the upper surface of the slate can be brought against the under surface of the grinding-wheel C, and by revolving the latter, and constantly pressing the disk upward, the face of the slate will be ground perfectly level and smooth.

A gauge, $b$, in shape of an up-and-down adjustable ring, or sleeve, is placed around each shaft E, and is held in any desired position by a set-screw, $c$.

The shaft E cannot be raised any further, as soon as the gauge $b$ strikes against one of the horizontal bars of the frame A.

The shafts E may be made stationary, that is, not revolving, or they can be provided with toothed wheels $d\,d$, which mesh into a pinion, $e$, which is mounted on the shaft B. They will then revolve in the opposite direction from the shaft B.

A set of disks for holding slates may also be arranged above the wheel C, so as to be brought against the upper surface of the same.

Instead of being vertical, the shafts B and wheel C may also be arranged horizontal, and operate equally well.

I claim as new, and desire to secure by Letters Patent—

1. In a slate-polishing machine, the combination of the horizontal grinding-wheel C with the mortised disks F, shafts E, either stationary or revolving, gauges $b$, and levers G, whereby the said disks F are elevated or depressed, all constructed and operating substantially as herein shown and described.

2. The construction and arrangement in the frame A, upon each side of the centre shaft B, of horizontal mortised disks F upon the vertical shafts E, either revolving or stationary, provided with the adjustable gauges $b$, and elevated or depressed by means of the levers G, substantially as herein shown and described.

3. The construction and arrangement of the vertical shaft B, supporting the horizontally-revolving wheel C, the mortised disks F, upon the shafts E, pressing the slate to be ground against the under surface of the grinding-wheel C, as herein shown and described.

4. The construction and arrangement of the levers G, pivoted in the frame A, and supporting upon their inner ends the vertical shafts E, substantially as herein set forth for the purpose specified.

STINSON HAGAMAN.

Witnesses:
WM. F. McNAMARA,
ALEX. F. ROBERTS.